United States Patent
Barie et al.

(10) Patent No.: US 7,845,895 B2
(45) Date of Patent: Dec. 7, 2010

(54) SPARE TIRE CARRIER WITH INTEGRATED TRUCK JACK AND SPARE TIRE LIFT

(75) Inventors: Mark R. Barie, Glenshaw, PA (US); James M. Helms, Mars, PA (US)

(73) Assignee: Ibis Tek, LLC, Butler, PA (US)

( * ) Notice: Subject to any disclaimer, the term of this patent is extended or adjusted under 35 U.S.C. 154(b) by 331 days.

(21) Appl. No.: 12/228,557

(22) Filed: Aug. 13, 2008

(65) Prior Publication Data

US 2009/0047108 A1 Feb. 19, 2009

Related U.S. Application Data

(60) Provisional application No. 60/964,749, filed on Aug. 14, 2007.

(51) Int. Cl.
*B62D 43/00* (2006.01)
(52) U.S. Cl. .............. 414/466; 414/427; 414/546; 414/494
(58) Field of Classification Search .......... 193/38; 211/104, 164, 165, 167, 169.1, 23, 99; 224/42.24–42.25, 224/495–496, 501–503, 509, 512–513; 254/2 C, 254/3 C, 3 R; 296/3, 37.2; 298/22 R; 414/24.5, 414/427–428, 462–466, 469, 477, 480, 494, 414/500, 537–538, 546, 547, 550, 555, 572, 414/647–648, 680, 719, 917, 920
See application file for complete search history.

(56) References Cited

U.S. PATENT DOCUMENTS

| | | | | | |
|---|---|---|---|---|---|
| 2,725,998 | A | * | 12/1955 | Huff | 414/428 |
| 3,014,698 | A | * | 12/1961 | Arnes | 254/124 |
| 4,155,472 | A | * | 5/1979 | Dansbury | 414/466 |
| 4,221,529 | A | * | 9/1980 | DeShano | 414/546 |
| 5,186,371 | A | * | 2/1993 | Jozefczak et al. | 224/42.21 |
| 5,269,501 | A | * | 12/1993 | Liegel et al. | 269/17 |
| 5,362,194 | A | * | 11/1994 | Kassebaum | 414/427 |
| 5,445,487 | A | * | 8/1995 | Koscinski, Jr. | 414/543 |
| 5,671,850 | A | * | 9/1997 | Basala | 211/23 |
| RE41,126 | E | * | 2/2010 | Hurlburt | 414/482 |

* cited by examiner

Primary Examiner—Gregory W Adams
(74) Attorney, Agent, or Firm—Karen Tang-Wai Sodini (57) ABSTRACT

A spare tire carrier featuring an integrated automotive jack, the jack used for manipulating the carrier into and out of a configuration suitable for transit. The jack may also be removed from the carrier, and used to elevate the vehicle. A strap and ratchet mechanism is also provided, helpful for securing the tire upon the carrier and also for leveraging the tire into place upon the carrier.

3 Claims, 10 Drawing Sheets

SPARE TIRE CARRIER WITH INTEGRATED TRUCK JACK AND SPARE TIRE LIFT

CROSS REFERENCE TO RELATED APPLICATIONS

This application claims the benefit of provisional patent application Ser. No. 60/964,749, filed by the present inventors on Aug. 14, 2007.

FIELD OF THE INVENTION

The present invention pertains to the field of motorized vehicles. More particularly, the present invention pertains to the field of tire carriers used to secure spare tires to motorized vehicles.

BACKGROUND OF THE INVENTION

Spare tire storage on motorized vehicles can make the process of loading and unloading the tire cumbersome and inconvenient. Therefore what is needed is an easy and convenient storage and loading/unloading system.

SUMMARY

The invention provides a spare tire carrier enabling a way to secure a tire to a motorized vehicle and leverage the tire on and off the carrier as needed.

DESCRIPTION OF THE DRAWING

The features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components.

10 spare tire carrier
11 basket strap
12 jack
13 pivoting strut
14 pivoting carriage
15 pivoting mount
16 pivoting linkage
25 travelling crossbeam
26 fixed crossbeam
27 ladder frame assembly
28a vertical support member
28b hinge pipe
30 top mount
30a adjustable arms
32 ratchet
34 cam lock
34a cam lever
34b U shaped member
36 fixed pipe/fixed tubular structure
500 vehicle bumper
501 vehicle hull

DETAILED DESCRIPTION

The invention is shown in attached FIGS. 1-10.

Figure 1:
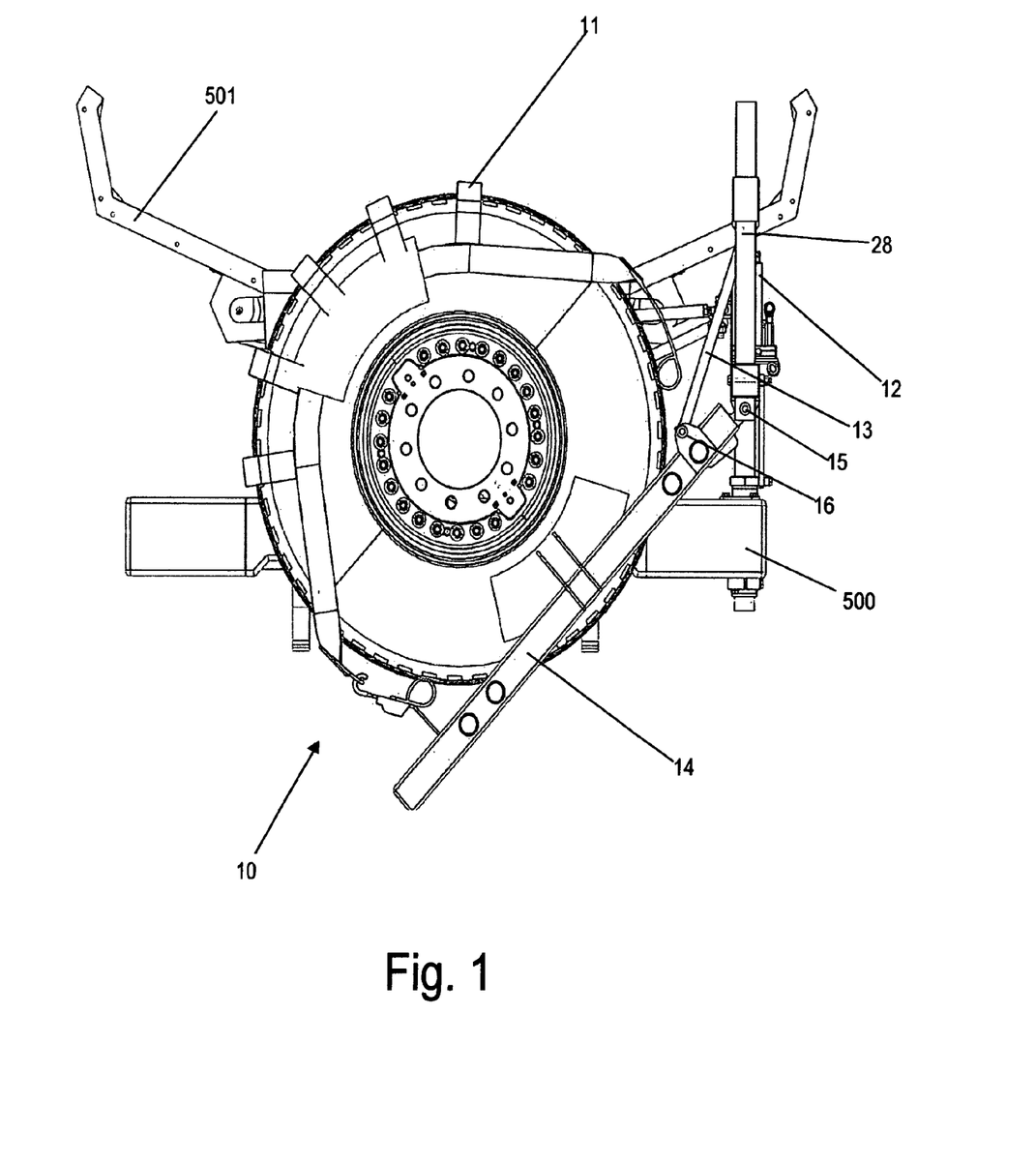
FIG. 1 is a side view showing the tire carrier securing a tire in loading/unloading position.
Figure 2:
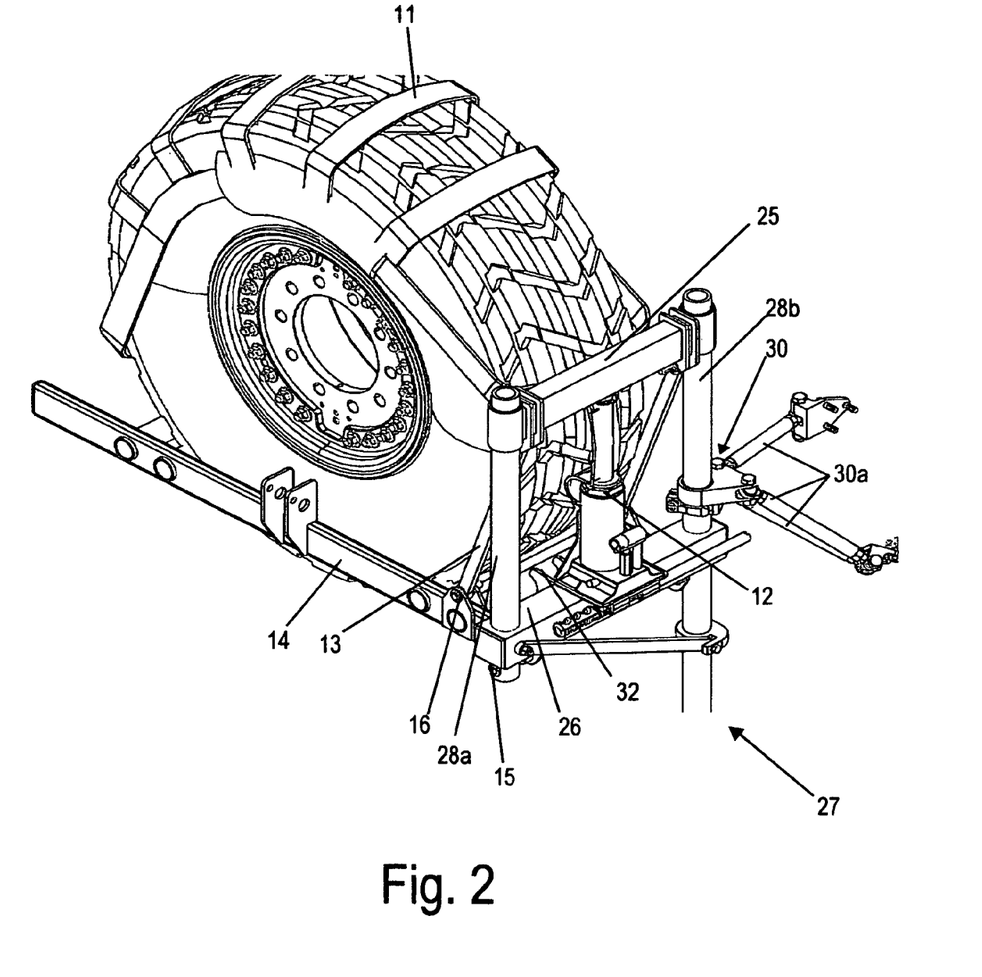
FIG. 2 is a perspective view showing the tire carrier securing a tire in transit position.
Figure 3:
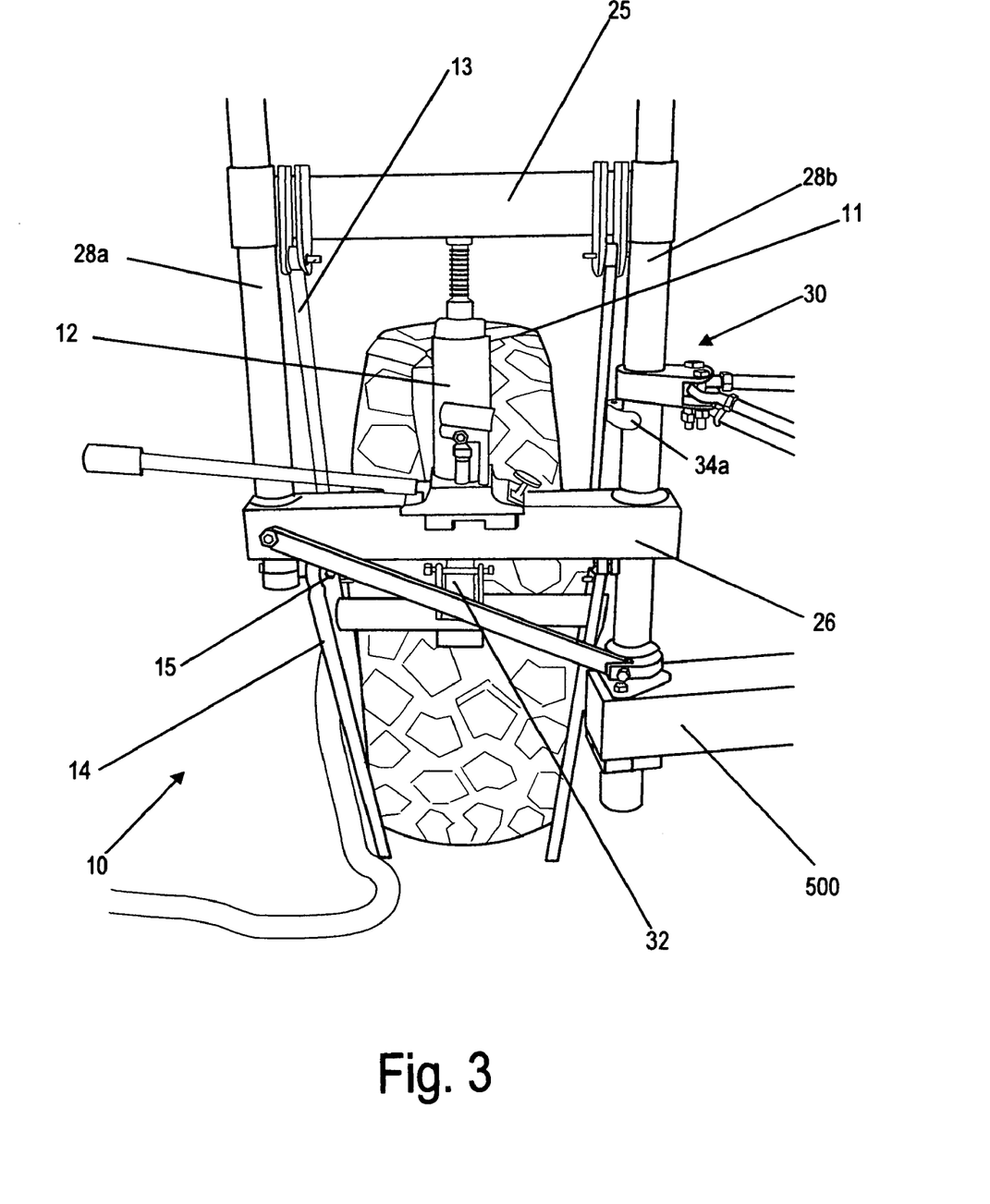
FIG. 3. is a perspective view showing the tire carrier securing a tire in loading/unloading position.
Figure 4:
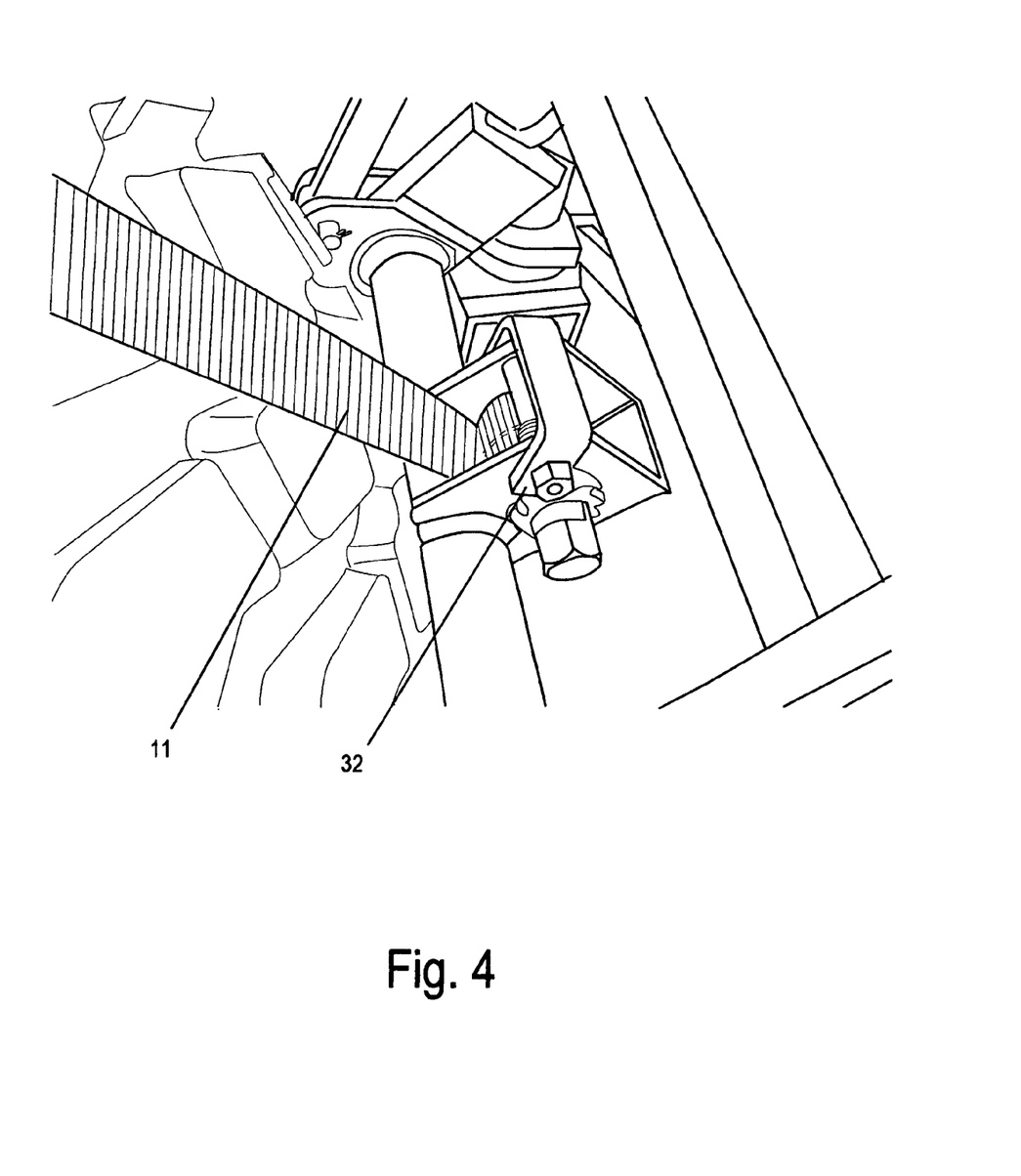
FIG. 4. is a detailed perspective view of the rachet mechanism.
Figure 5:
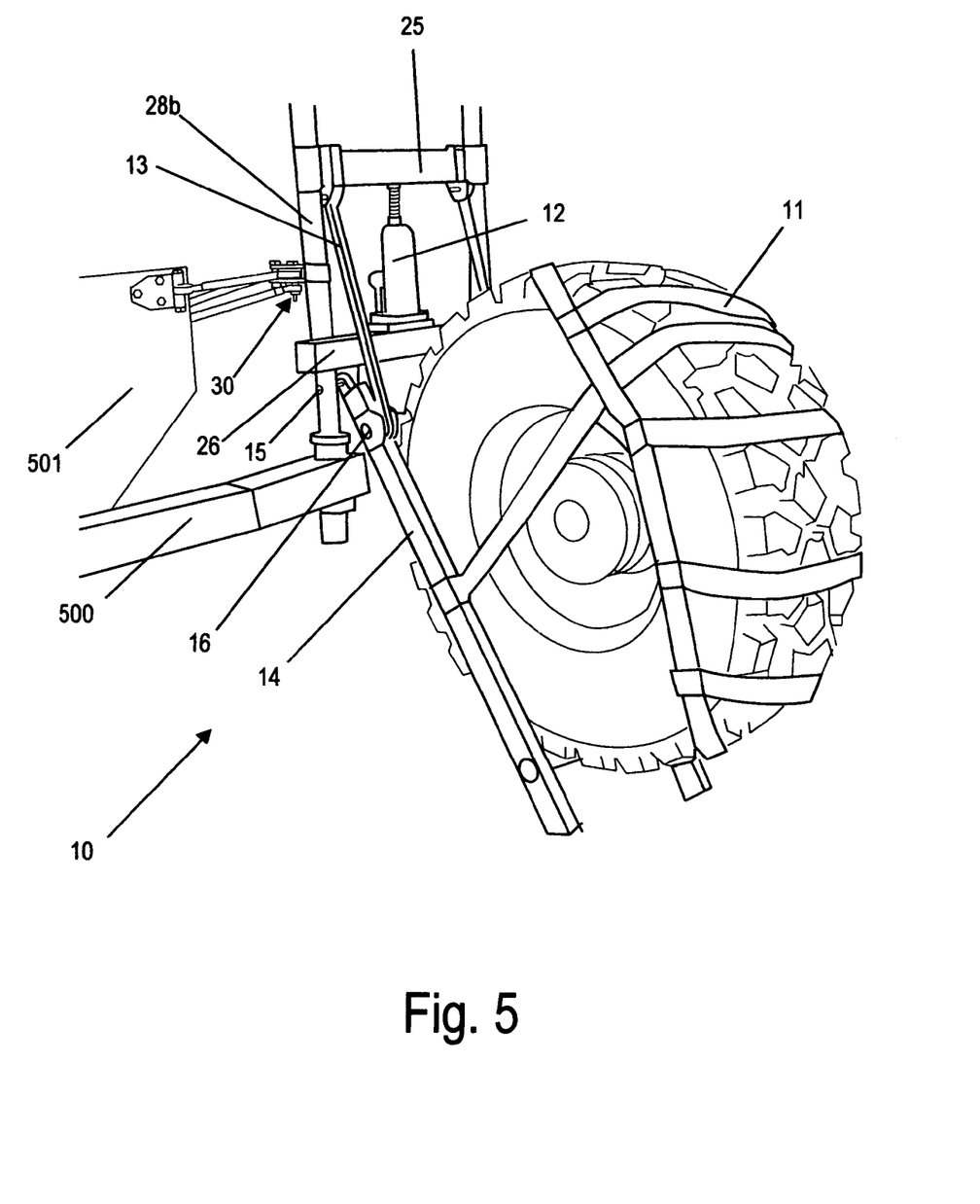
FIG. 5. is a perspective view showing the tire carrier securing a tire in loading/unloading position.
Figure 6:
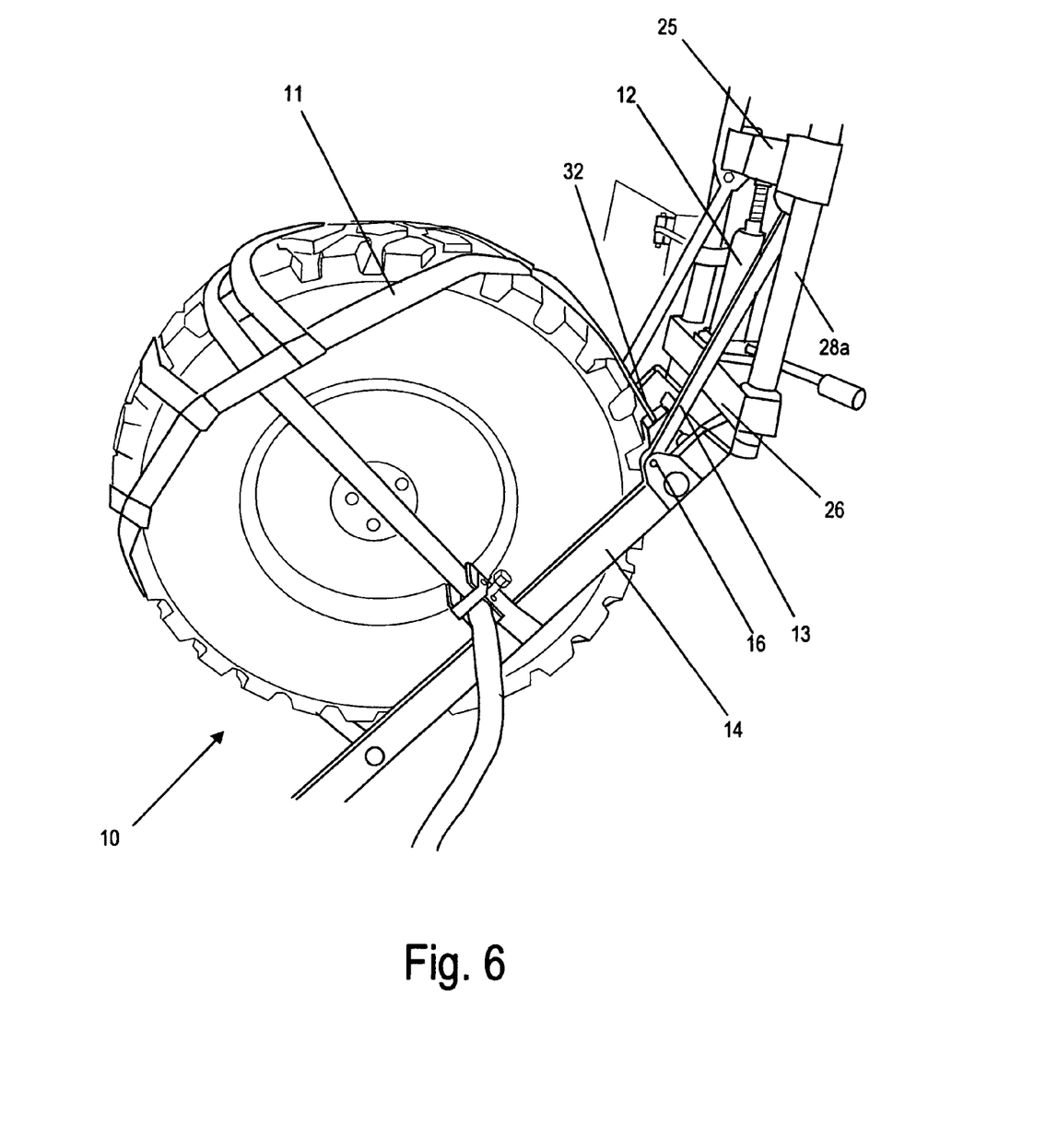
FIG. 6. is a perspective view showing the tire carrier securing a tire in loading/unloading position.
Figure 7:
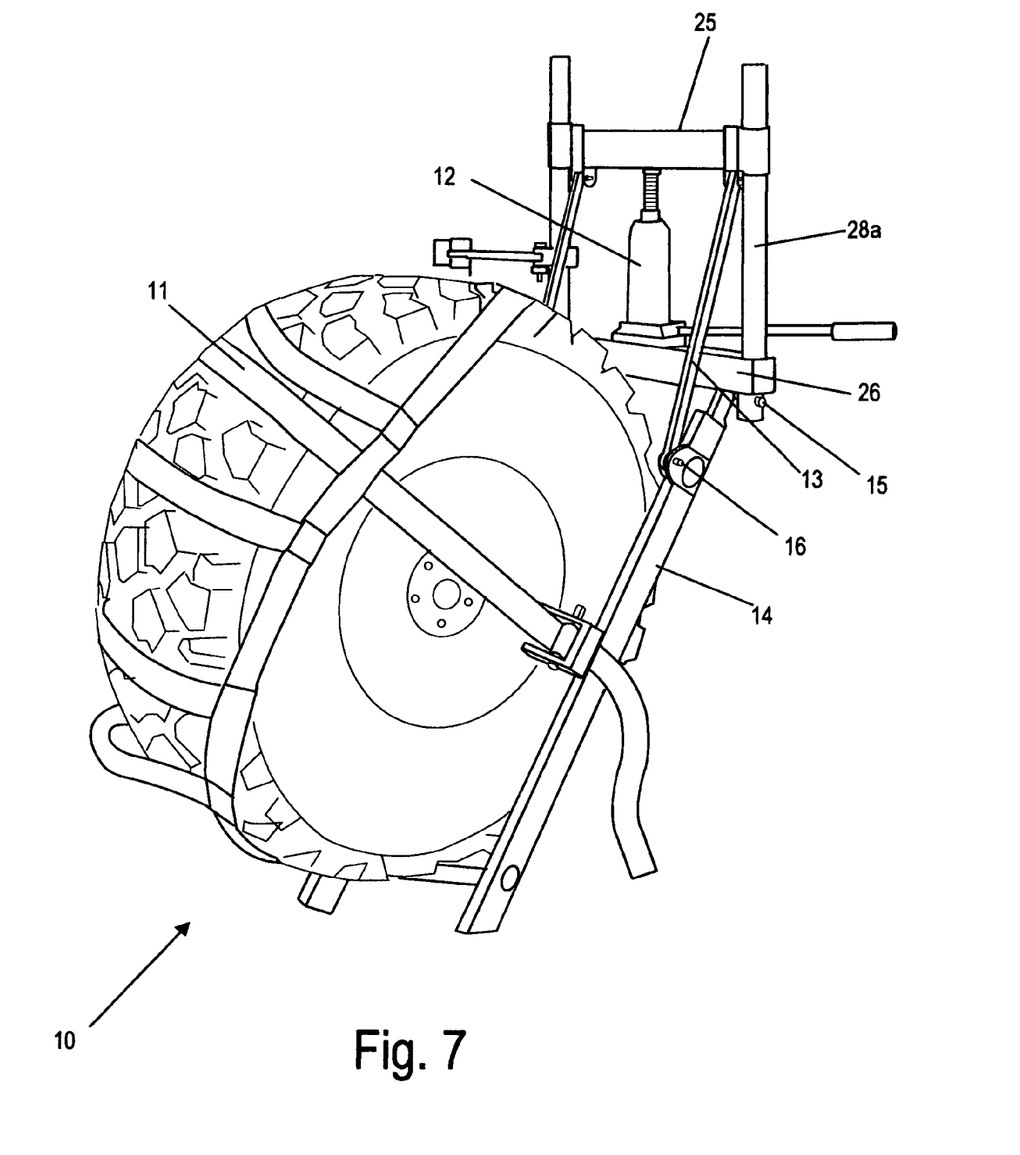
FIG. 7. is a perspective view showing the tire carrier securing a tire in loading/unloading position.
Figure 8:
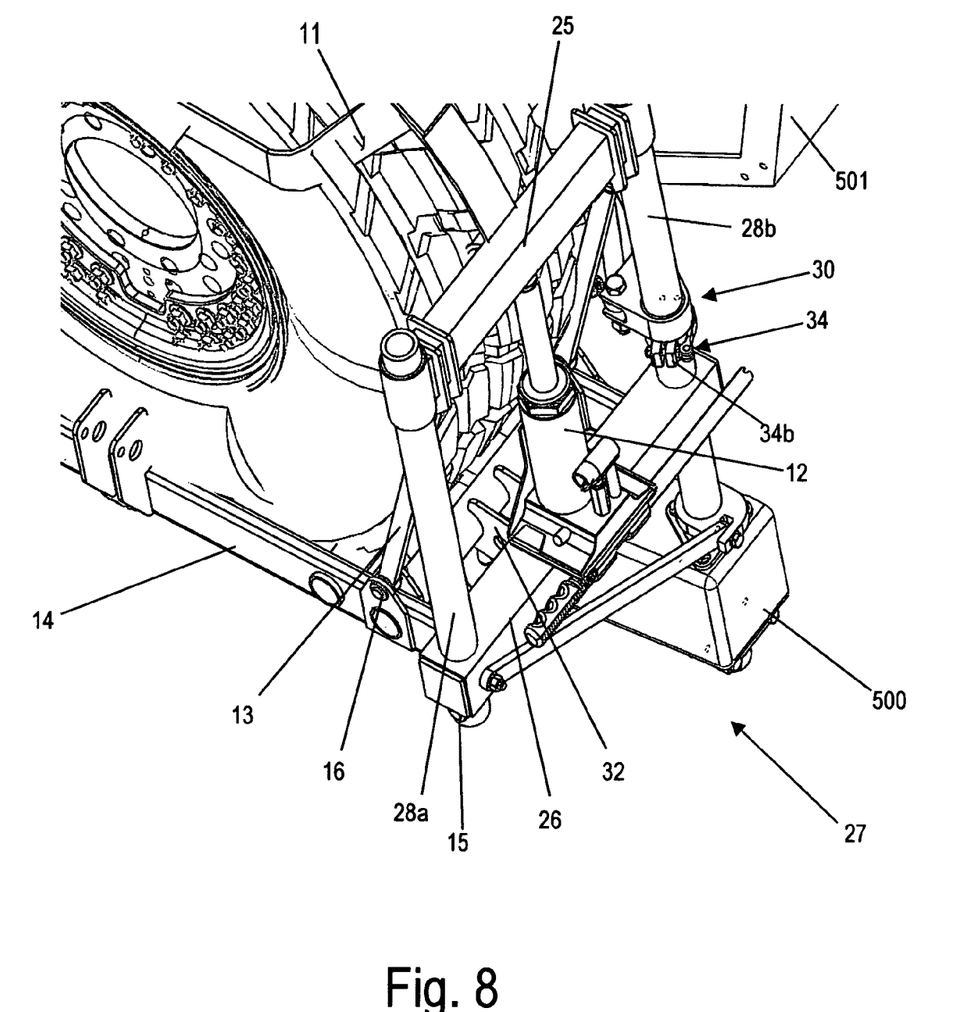
FIG. 8. is a detailed perspective view of the ladder frame assembly and jack.

As can be seen from FIGS. 1-10, the invention provides a tire carrier 10, which may include a hydraulic jack 12 used for lifting a vehicle and also for moving the tire carrier into and out of a transit position. The transit position is shown in FIG. 2, and the loading/unloading position is shown in FIG. 1. Instead of or in addition to the hydraulic jack, the invention may include a strap 11 and ratchet 32 used for securing the tire to the tire carrier and leveraging the tire onto the tire carrier. While a hydraulic jack is used in the present embodiment of the spare tire carrier, pneumatic, mechanical or motor operated jacks may also be used. Additionally, a removable cover is provided for the jack to protect it against the elements.

The tire carrier 10 comprises a pivoting carriage 14 in which a tire may be seated, and in some embodiments the carriage may be connected via a pivoting mount 15 to a ladder frame assembly 27 comprising a fixed vertical support member 28a, a rotating vertical support member hinge pipe 28b, a fixed crossbeam 26, and a parallel travelling crossbeam 25 that slides up and down along the support members. In such embodiments, the travelling crossbeam is typically connected via pivoting struts 13 at pivoting linkage 16 to the pivoting carriage 14 in which the tire is seated so that, as the pivoting carriage 14 pivots about the ladder frame assembly, the crossbeam travels vertically along the support members 28a, 28b of the ladder frame assembly 27. Some embodiments may also comprise means for locking the travelling crossbeam in place so that the frame in which the tire is seated may not freely pivot; such means for locking may include bolts or pins.

A jack 12 may be placed upon the fixed crossbeam 26 within the ladder frame assembly, so that the travelling crossbeam 25 rests on the jack's lifting surface. As the jack is extended, the travelling crossbeam is lifted, thereby pivoting the entire carriage 14 upwards. Lowering the jack will cause the carriage 14 in which the tire is seated to pivot in the opposite direction. The jack may be secured in place by virtue of the torque applied by the travelling crossbeam 25 by the mass of the carriage in which the tire is seated, or by securely torquing the jack in place against the locked travelling crossbeam, or by any alternate means of fastening, such as a strap or a bracket. Once the pivoting carriage 14 in which the tire is seated is elevated into a position suitable for transit (or lowered so as to facilitate removal of the tire from the carrier) the travelling crossbeam 25 may be locked into place and the jack removed.

As mentioned above, the tire may be secured to the pivoting carriage 14 by means of a strap, which may be what is sometimes called a basket strap 11 or may be any other suitable strap. A ratchet 32 may be fixed to either the ladder frame assembly 27 or the pivoting carriage 14 in which the tire is seated. The ratchet tensions the strap against the tire, holding the tire securely in place. The strap and ratchet may further be used to provide a mechanical advantage helpful in lifting the tire onto the pivoting carriage 14.

Figure 9:
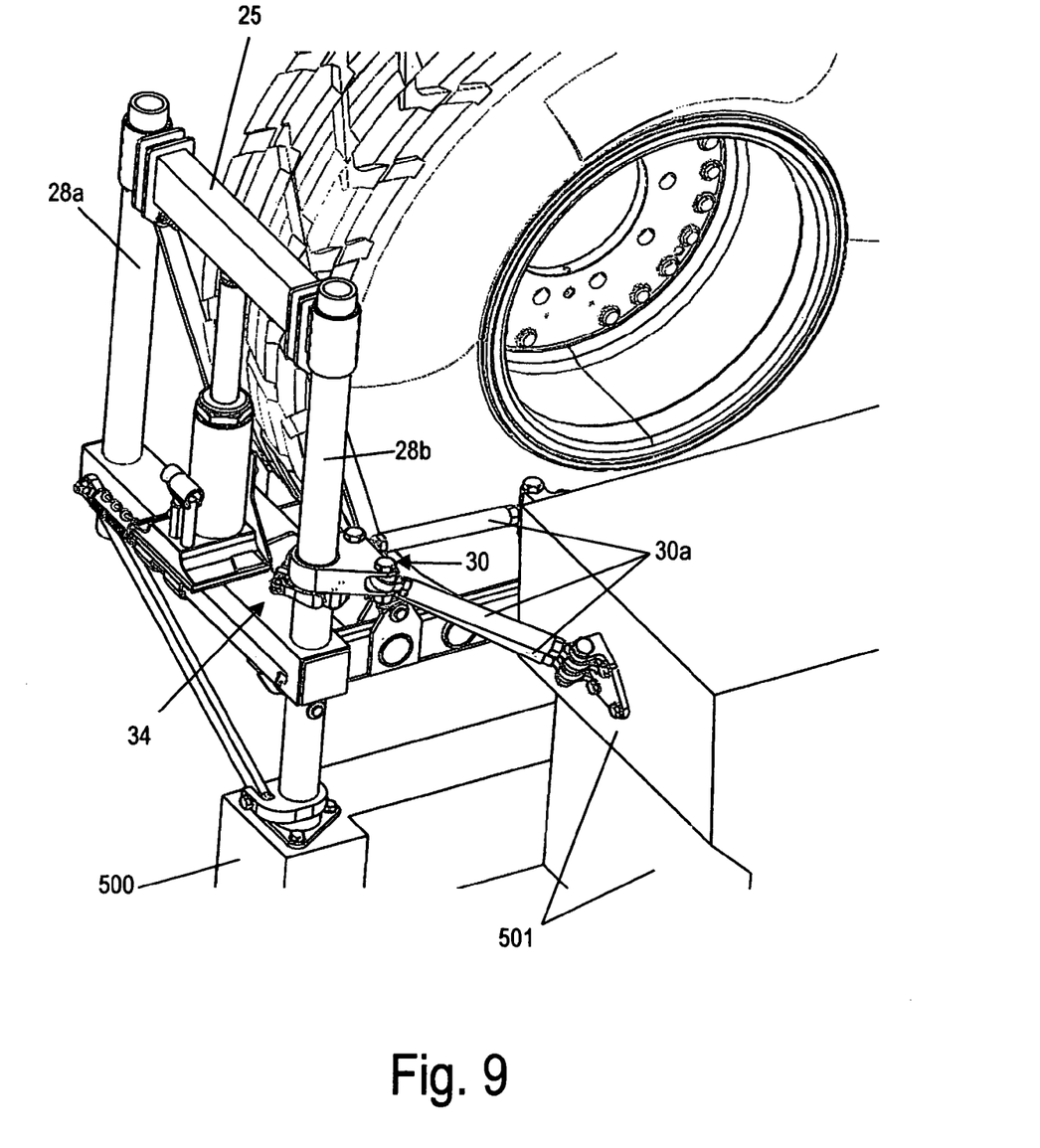
FIG. 9 is a detailed perspective view of the ladder frame assembly fixed to a motorized vehicle bumper and side.
Figure 10:
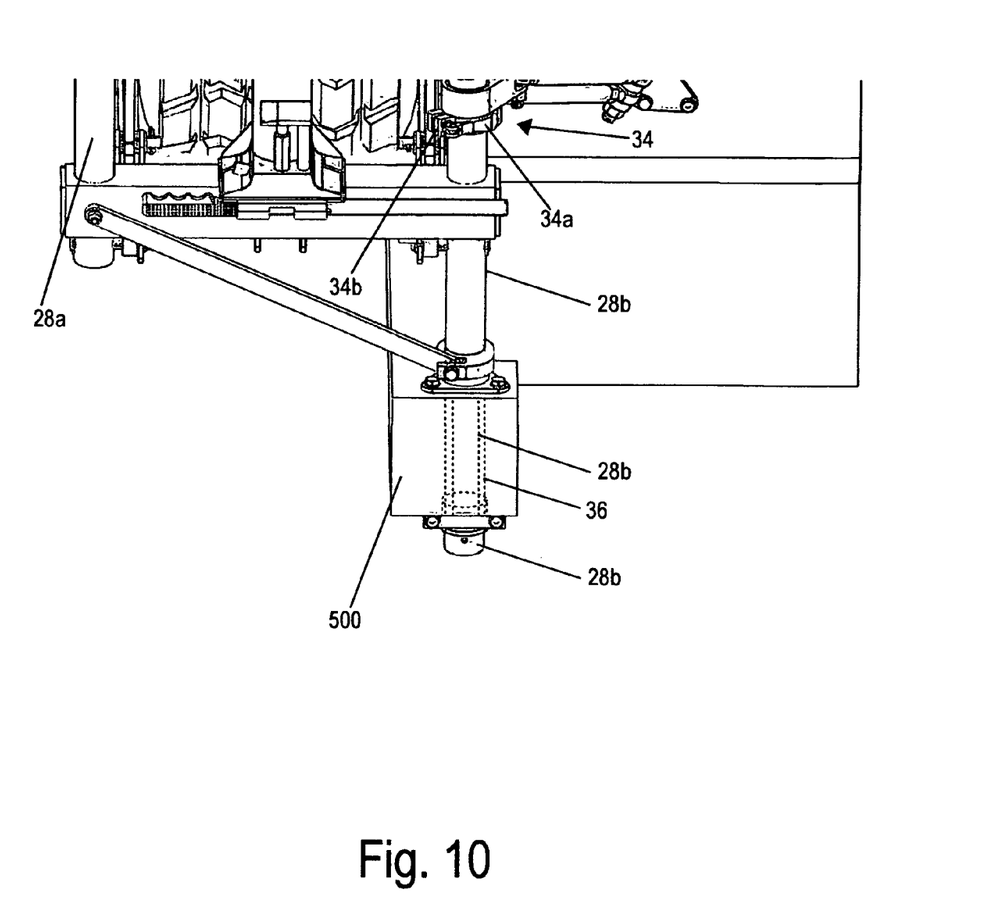
FIG. 10 is a detailed perspective view of the lower portion of the ladder frame assembly, showing the fixed pipe/fixed tubular structure within the vehicle bumper and the insertion of the hinge pipe into the fixed pipe.

Looking more specifically at FIGS. 9-10, the ladder frame assembly 27 attaches to the vehicle at two places. The first attachment location is at the vehicle's bumper 500, where a fixed pipe/fixed tubular structure 36 is inserted into the bumper 500 and hinge pipe 28b inserts into the fixed pipe 36, allowing the spare tire carrier to rotate around the hinge pipe 28b towards and away from the vehicle. This allows users of the invention to access storage spaces that may otherwise be obstructed by the spare tire carrier. The second attachment location is on the vehicle hull 501, where hinge pipe 28b inserts into a top mount 30 having a plurality of adjustable arms 30a affixed to the hull 501. A cam lock 34, located directly beneath top mount 30, and comprising a cam lever 34a, a U-shaped member 34b surrounding hinge pipe 28b, and a bolt penetrating the member 34b, allows a user to lock the hinge pipe 28b in a desired position by pushing down on the cam lever 34a to compress the U-shaped member's ends together at the bolt, stopping free rotation of the hinge pipe 28b.

The invention is of use, e.g., as an accessory for utility vehicles, including tactical military vehicles, such as the HMMWV (high mobility multipurpose wheeled vehicle). As is clear from the description, though, the invention is clearly of use in other than such vehicles, and in particular is of use in case of military or non-military vehicles with tires that cannot be easily manipulated by a single individual, such as the tire depicted in FIGS. 1-10.

It is to be understood that the arrangements shown and described above and in the attachments are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus for use as a component of a spare tire carrier (10) attached to an outside surface of a wheeled vehicle, comprising:

a ladder frame assembly (27) having a vertical support member (28a) and a hinge pipe (28b) in spaced apart relation, a fixed crossbeam (26) fixedly attached horizontally to the vertical support member (28a) and to the hinge pipe (28b), and a travelling crossbeam (25) slideably attached to the vertical support member (28a) and to the hinge pipe (28b), and a jack (12) disposed so as to rest on the fixed crossbeam (26) and so as to push against the travelling crossbeam (25) when operated so as to be placed in an extended position and thereby raise or lower the traveling crossbeam (25), and the ladder frame assembly also having a fixed cylindric tubular structure (36) fixedly attached to the vehicle, wherein the hinge pipe (28b) is fitted into the fixed tubular structure (36) so as to be rotatable within the fixed tubular structure (36); and a carriage (14) configured to hold a tire, having a proximal end pivotally connected to the ladder frame assembly (27) via a pivoting mount (15), and also connected to the travelling crossbeam (25) by one or more pivoting struts (13), and also having a distal end free to pivot with respect to the vertical support members (28) and free to rotate with respect to the one of the vertical support members (28) fitted into the fixed tubular structure (36);

wherein the traveling crossbeam is mechanically linked to the proximal end of the carriage via the pivoting mount (15) so that lowering the traveling crossbeam (25) causes the distal end of the carriage (14) to pivot about the proximal end in a downward direction, and raising the crossbeam causes the distal end of the carriage to pivot about the proximal end in an upward direction so as to result in the carriage (14) having a horizontal orientation when the traveling crossbeam (25) can be raised no further.

2. The apparatus of claim 1, further comprising:

a strap (11), connected at a distal end to the carriage (14) and having a proximal end, and including a netting as a middle portion between the distal end and the proximal end; and a ratchet (32), connected to the ladder frame assembly, and configured for pulling on the strap (11) at the proximal end of the strap (11), for creating tension in the strap (11) for leveraging the tire onto the carriage (14) by pulling on the strap (11) when the carriage (14) is pivoted downward so as to locate the distal end of the carriage (14) on ground, and for holding the tire in the carriage (14) after the tire is pulled onto the carriage (14).

3. The apparatus of claim 1, further comprising:

a strap (11), for securing the tire to the pivoting frame; and a ratchet (32), connected to the ladder frame assembly (27) and configured for grabbing the strap (11), for tensioning the strap (11) and leveraging the tire onto the pivoting carriage (14) with the aid of the strap (11).

* * * * *